United States Patent [19]

Pomeroy et al.

[11] 4,048,529
[45] Sept. 13, 1977

[54] FLOW CONTROL DEVICE FOR SUPERCONDUCTIVE ROTOR REFRIGERANT

[75] Inventors: Bruce D. Pomeroy, Schenectady, N.Y.; Philip G. Kosky, Bethlehem, Pa.

[73] Assignee: General Electric Company, Schenectady, N.Y.

[21] Appl. No.: 635,665

[22] Filed: Nov. 26, 1975

[51] Int. Cl.$^2$ .............................................. H02K 9/20
[52] U.S. Cl. ........................................ 310/54; 62/505; 62/514 R
[58] Field of Search .................... 310/10, 61, 40, 52, 310/54, 64; 62/54, 55, 499, 505, 514

[56] References Cited

U.S. PATENT DOCUMENTS

| 3,306,074 | 2/1967 | Wilson | 62/505 |
| 3,471,726 | 10/1969 | Burnier | 310/54 |
| 3,809,933 | 5/1974 | Sugawara | 310/52 |
| 3,816,780 | 6/1974 | Smith | 310/52 |

Primary Examiner—R. Skudy
Attorney, Agent, or Firm—Leo I. MaLossi; Joseph T. Cohen; Jerome C. Squillaro

[57] ABSTRACT

Cryogenic liquid for cooling the rotor of a superconducting generator enters the rotor along the inner surface of a centrally-disposed rotating conduit extending into the rotor. From the resulting annulus of liquid coolant surrounding a vapor core, liquid coolant flows via a pair of liquid-delivery ducts to the surface of the pool of coolant bathing the rotor windings. Each delivery duct comprises a radially-extending receiving tube and a radially-extending delivery tube interconnected by an over-flow trap. The outer end of the delivery tube is in flow communication with the vapor in the central core of the rotor winding chamber and the inner end of the receiving tube is in flow communication with both the liquid coolant and the vapor core in the rotating conduit.

10 Claims, 2 Drawing Figures

FLOW CONTROL DEVICE FOR SUPERCONDUCTIVE ROTOR REFRIGERANT

BACKGROUND OF THE INVENTION

This invention relates to electrical machines employing superconducting rotors, and more particularly to a method and apparatus for supplying coolant at cryogenic temperatures to the rotor windings of superconductive machines at a predetermined pressure.

In electrical generators having superconducting rotors, the windings are bathed in a pool of very cold liquefied gas, e.g., liquefied helium, which absorbs heat, i.e., from the windings, and consequently evaporates to its gaseous form (herein referred to as "vapor"). Typically the generator is paired with a turbine, and the rotor of one is connected to that of the other. The portion of the generator rotor connected to the turbine rotor is the "driven" end and the portion at the opposite end of the generator is the "undriven" or "collector" end of the generator rotor.

It is necessary to provide means for placing the rotor winding pool in flow communication with the refrigerator which liquefies the coolant, both to supply coolant to the winding pool and to recover evaporated coolant for reliquefication. The windings rotate, while the liquefier is stationary and external to the generator. Accordingly, the supply of liquid coolant is connected to conduits within the generator, which serve the winding pool, through a fluid transfer joint disposed between rotating and nonrotating elements.

It is desirable in a helium cooling system for superconductive rotor applications to be able to deliver metered liquid helium flow at a predetermined pressure (and hence temperature) at an infinitely subdividable range of flow and independent of rotor speed. The system should be capable of performing properly at different mass flow rates, and coolant flow should be controlled accurately such that the minimum required flow is supplied. For high efficiency, vapor supplied with the liquid, or released from it through any transport process, should also be used for rotor cooling, although a substantial portion of the winding itself should always be immersed in liquid helium.

An invention addressing itself to these same objectives is disclosed in copending U.S. patent application Ser. No. 573,168 — Laskaris et al. (Self-Regulating Transport Mechanism For Superconductive Rotor Refrigerant), filed Apr. 30, 1975 and assigned to the assignee of the instant invention.

DESCRIPTION OF THE INVENTION

In the present invention, the liquid refrigerant or coolant, typically liquid helium, is supplied as two-phase flow to the rotor via an annular rotating delivery duct between concentric conduits extending axially into the rotor. The liquid portion of the flow is disposed as an annulus around a centrally-disposed vapor core. After delivery into the rotor, this vapor is returned via the inner conduit and the liquid coolant from the axially rotating conduit, at a pressure slightly above atmospheric, is transferred to at least one radially-extending rotating delivery duct. Each delivery duct comprises a radially-extending receiving tube and a radially-extending delivery tube interconnected by an overflow trap. The outer end of the delivery tube is in flow communication with the vapor in the central core of the rotor winding chamber and the inner end of the receiving tube is in flow communication with both the liquid coolant and the vapor core in the rotating conduit. The diameter of these radial tubes is sufficiently large such that the liquid coolant flows along the tube walls (under the influence of Coriolis acceleration and the radial acceleration) while vapor flows through the central core. In the overflow trap one continuous body of liquid is disposed as two interconnected radially-extending columns of the liquid coolant; the radial length of the two columns of liquid are different. The difference being due to the different pressure conditions in the vapor at the opposite ends of the body of liquid. The receiving and delivery tubes are both occupied by liquid and vapor, the receiving tube conducting liquid to the body of liquid in the overflow trap and the delivery tube conducting liquid away from the body of liquid.

Liquid coolant discharged from the outer end of each delivery tube into the central (vapor) core of the rotor winding chamber impinges on the surface of the winding pool. Vapor from the delivery tube is discharged to, and forms part of, the central core.

BRIEF DESCRIPTION OF THE DRAWINGS

The features of the invention believed to be novel are set forth with particularity in the appended claims. The invention itself, however, as to the organization, method of operation, and objects and advantages thereof, may best be understood by reference to the following description taken in conjunction with the accompanying drawings in which:

METHOD AND PROCESS OF MAKING AND USING THE INVENTION

Figure 1:
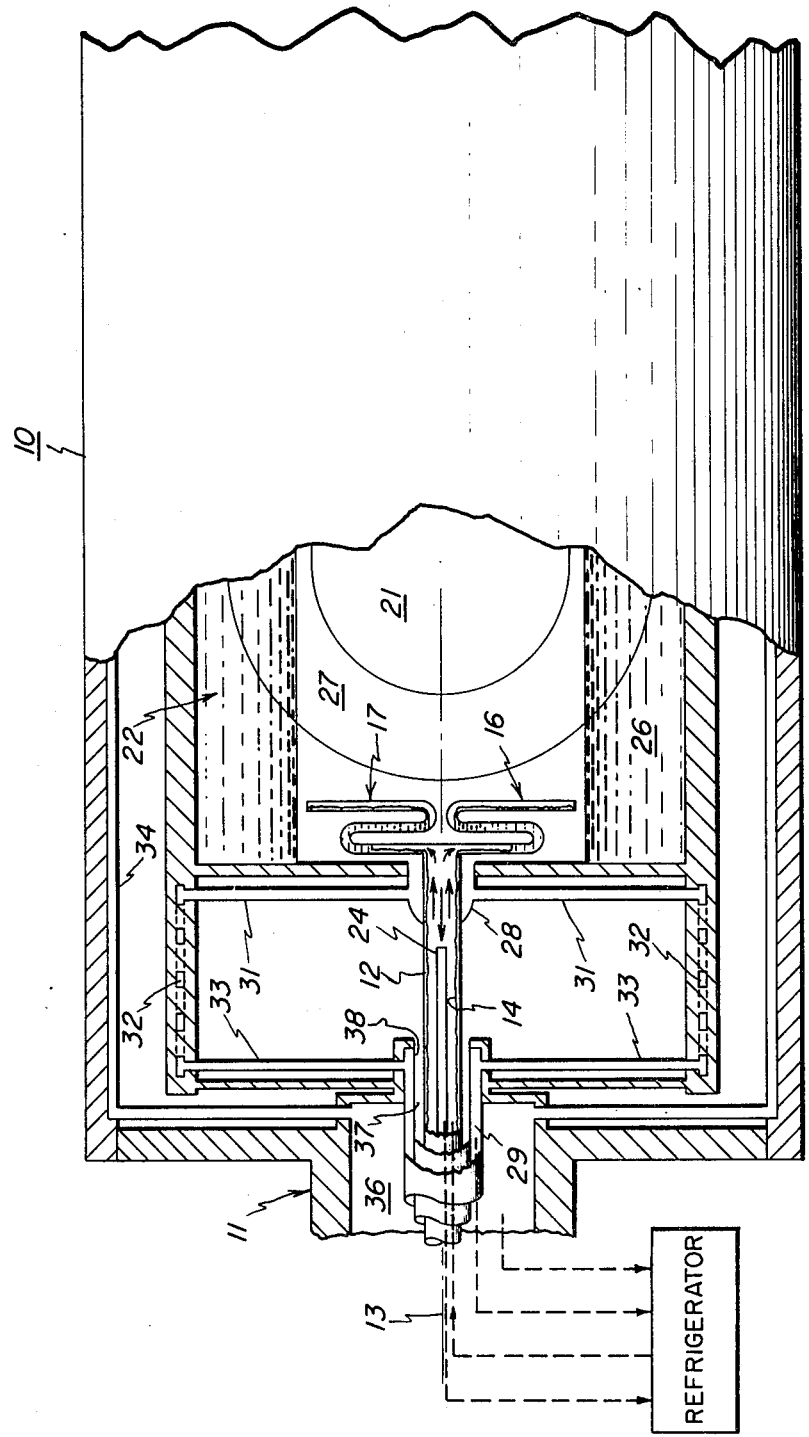
FIG. 1 is a schematic, longitudinal view partly in section, of a superconductive A.C. generator rotor embodying the instant invention.

Superconductive rotor 10 for an A.C. machine, such as a generator, includes a driven end (not shown) and a nondriven or collector end 11. Cryogenic refrigerant in the form of saturated liquefied coolant, typically helium at 4.2° K, is supplied to the collector end of the rotor through a conduit 12 from a transfer joint (not shown) in a manner such as is described and claimed in U.S. patent application Ser. No. 573,170 — Hatch, filed Apr. 30, 1975 and U.S. Pat. No. 3,991,588 — Laskaris. Both of these applications are assigned to the instant assignee and are incorporated by reference. As conduit 12 rotates axially about longitudinal axis 13 in unison with rotor 10, the coolant in conduit 12 separates centrifugally into a vapor phase core surrounded by a liquid phase film, producing a vapor-liquid interface 14.

Figure 2:
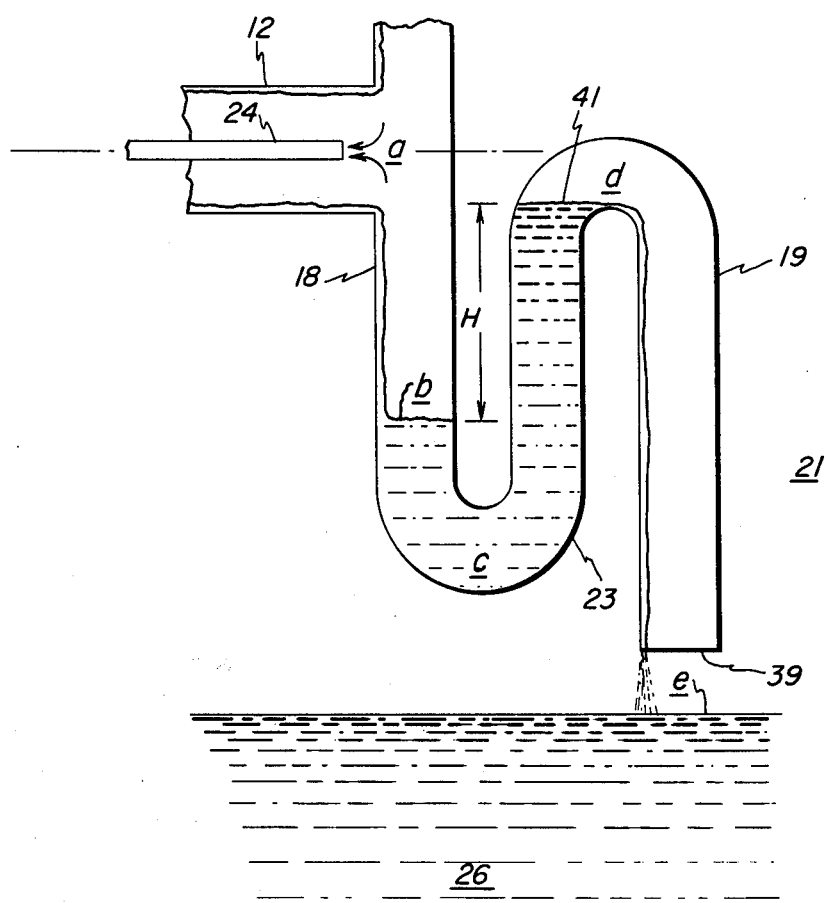
FIG. 2 is a sectional, schematic view of the delivery duct (flow control device) contemplated as the best mode of this invention drawn to a larger scale.

Conduit 12 is terminated at and is in flow communication with refrigerant dispensing means comprising a pair of liquid-delivery ducts 16, 17. As shown in FIG. 2, each duct 16, 17 is made up of a radially-extending receiving tube 18 connected to conduit 12, open-ended radially-extending delivery tube 19 discharging fluid into the centrally-located vapor core 21 in rotor winding chamber 22 and the "S" bend, or overflow trap, 23 interconnecting tubes 18 and 19. Each tubular member 18, 19 is of sufficiently large inside diameter to permit coolant in the liquid phase to flow as a film or as droplets along the tube wall while coolant in the vapor phase will occupy the tube central core. The trap 23 operates with the outer end thereof full of liquid coolant, the distance H between the legs of liquid prevailing at any instant will be a function of the rotational speed, which in turn compresses vapor in tube 19, and the pressure of the vapor in tube 18. The vapor results from flow losses experienced by the liquid coolant. Provision is made for removing vapor entering via conduit 12 and vapor generated in tube 18, this vapor being returned to the compressor (not shown) via vapor return tube 24. The pressure of this vapor (slightly above atmospheric pressure) is maintained by the use of the flow control device.

Pool 26 is separated centrifugally from a central core 21 of coolant in the vapor phase (i.e., boiloff) due to rotation of the rotor. The height of the pool surface is regulated by a liquid level control device (not shown) to automatically provide the mass flow rate required to meet the evaporation rate requirements of the rotor at all times. Rotor windings 27 are immersed at least in part in pool 26.

Coolant in the vapor phase in rotor 10 is returned from the central vapor core 21 to a refrigerator via hub 28 in flow communication therewith where it is compressed and liquified. The gaseous coolant flows from hub 28 into a conduit 29 via conduit system 31, 32, 33. Conduit 29 conducts the coolant to the transfer joint from whence it is discharged to the refrigerator for reliquefication. Similarly, coolant in the vapor phase is returned from the driven end of rotor 10 via conduit 34 in flow communication with central core 21 at the driving end. The gaseous coolant return flow from conduit 34 enters annular space 36 and is returned for reliquefication.

No continuous flow occurs through annulus 37 between conduits 12 and 38 inasmuch as annulus 37 is a vacuum jacket terminated at a sealed end (not shown), such as a bellows, located in the transfer joint. A typical termination of this type is illustrated in the aforementioned Laskaris application.

Liquid helium in each trap 23, after being piped around the first bend, passes to the second bend where it overflows into delivery tube 19 as additional liquid is delivered into receiving tube 18 and is discharged from open end 39 to reach pool 26. The lowest pressure in the flow control device is the pressure above the liquid helium free surface 41, where the overflow occurs. In this way the flow control device functions as a means for maintaining the pressure at the center line (in the vapor core within vapor-liquid interface 14) at one atmosphere or above, e.g., 17 psi absolute, whereby problems with air leaks through the machine seals are obviated.

Conducting metered liquefied gas to the rotor winding pool in this manner avoids imposing radial compression (and consequent temperature rise) of the liquefied gas or liquefied gas/vapor diphasic mixture and insures that the liquefied gas will reach the pool at a predetermined saturation pressure, and hence temperature. These conditions prevail at rotational speeds from very slow to full operational speed.

Table 1 below displays representative values for pressures prevailing at points $b$ and $d$ during operation at 3600 rpm for two different size rotors. The configuration for the delivery duct considered would locate level 41 at the centerline 13. "R" represents radial distance from the centerline to the specific point; "P" represents pressure.

TABLE 1

| $P_a = P_3 = 1$ atmosphere $R_a = R_d = 0$ cm | | | |
|---|---|---|---|
| $R_b$ (cm) | $R_c$ (cm) | $P_b$ (atm) | $P_d$ (atm) |
| 9.6 | 38 | 1.12 | .24 |
| 4.5 | 12.7 | 1.03 | .83 |

Materials for construction of the flow control device must be compatible with the mechanical and thermal stress constraints in the cryogenic system. Certain stainless steels, for example, meet these criteria.

In the interest of simplicity, no attempt has been made to depict the actual location of liquid flow in tubes 18 and 19 as this flow is affected by Coriolis acceleration.

The term "weight" as used in the claims means the centrifugally-induced weight of the liquid or gas. Any flow control device encompassed by this invention must provide for having the net centrifugally-induced weight of a column of liquid (i.e., column H) be balanced by the combined effect of the centrifugally-induced weights of a pair of columns (i.e., the column from $a$ to $b$ and the column from surface 41 to end 39) of vapor.

What we declare as new and desire to secure by Letters Patent of the U.S. is:

1. In a transport mechanism wherein liquefied gas is conducted to the superconductive windings of an electrical generator in order to supply a pool bathing at least part of said windings with the whole of said windings being maintained at cryogenic temperatures, the transport function being accomplished via conduit means disposed generally axially of said generator and in flow communication with the inner end of dispensing means adapted to conduct the liquefied gas to said pool, said pool being disposed radially outward of said despensing means, the improvement comprising:

said dispensing means being tubular and providing a continuous path for fluid flow therethrough, said path being generally radial in disposition with at least one reversal of direction therein to accommodate a single continuous body of liquid such that the net weight of said body of liquid is balanced by the combined weights of two radially-extending columns of vapor, one such column being in contact with each end of said body of liquid; and means being provided in flow communication with said conduit means for returning vapor from the inner end of said dispensing means to the outside of said generator.

2. The improvement recited in claim 1 wherein the single continuous body of liquid is in the shape of two interconnected columns of liquid of different lengths.

3. The improvement recited in claim 1 wherein the dispensing means consists of a tube extending radially outward from the axially-disposed conduit means, turning substantially 180° to extend radially inward to the vicinity of the axis of the generator and then turning a second time substantially 180° to extend radially outward.

4. The improvement recited in claim 1 wherein the dispensing means is of substantially constant diameter.

5. The improvement recited in claim 1 wherein the means for returning vapor comprises a tube disposed within the conduit means.

6. The improvement recited in claim 1 wherein the cross-sectional area of each of the inner and outer ends of the dispensing means is sufficient to simultaneously accommodate liquid flow and vapor flow therealong.

7. A method for transporting coolant to the superconductive windings of an electrical generator wherein said windings are bathed at least in part in a pool of cryogenically cooled, liquefied gas which in removing heat from said generator evaporates to form a first core of vapor, said method comprising the steps of:

delivering from an outside refrigerator through a rotating conduit and into said rotor liquefied gas disposed around a second core of vapor generated therefrom, said rotating conduit being substantially concentric with the longitudinal axis of said rotor and the liquefied gas and vapor both being at cryogenic temperature;

conducting the delivered liquefied gas into the first open end of a delivery duct for movement radially outward to one end of a single continuous body of liquefied gas, said second central core of vapor remaining in flow communication with said one end at all times;

removing liquefied gas from the opposite end of said body of liquefied gas, the liquefied gas so removed passing radially outward through the second open end of said delivery duct for discharge at a location radially outward of said rotating conduit and radially inward of the surface of said pool, said first core of vapor remaining in flow communication with said opposite end at all times, whereby the net weight of said body of liquefied gas is balanced by the combined weights of two radially-extending columns of vapor, one such column being in contact with each end of said body of liquefied gas; and returning vapor from said first and second cores of vapor to said outside refrigerator.

8. The method recited in claim 7 wherein the single continuous body of liquefied gas is in shape of two interconnected columns of liquefied gas of different lengths.

9. The method recited in claim 7 wherein the gas is helium.

10. The method recited in claim 7 wherein the pressure of the vapor in the second core of vapor is greater than one atmosphere.

* * * * *